US007346912B2

(12) United States Patent
Seebaldt

(10) Patent No.: US 7,346,912 B2
(45) Date of Patent: Mar. 18, 2008

(54) METHOD AND SYSTEM FOR MANAGING VIDEO DEVICES

(75) Inventor: Kurtis L. Seebaldt, Round Rock, TX (US)

(73) Assignee: Tandberg Telecom AS, Lysaker (NO)

(\*) Notice: Subject to any disclaimer, the term of this patent is extended or adjusted under 35 U.S.C. 154(b) by 684 days.

(21) Appl. No.: 10/212,400

(22) Filed: Aug. 5, 2002

(65) Prior Publication Data

US 2004/0216123 A1    Oct. 28, 2004

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)
*H04L 12/16* (2006.01)
*H04Q 11/00* (2006.01)

(52) U.S. Cl. ............... 719/328; 719/321; 709/204; 709/205; 709/206; 709/207; 370/260; 715/733; 715/748; 715/750; 715/751; 348/14.08; 348/14.09; 348/14.1

(58) Field of Classification Search ............... 718/318; 719/310, 328, 321; 709/204–207; 370/260; 715/733–759; 348/14.08–14.1
See application file for complete search history.

(56) References Cited

U.S. PATENT DOCUMENTS

| 5,515,296 | A | * | 5/1996 | Agarwal | 709/204 |
|---|---|---|---|---|---|
| 5,973,724 | A | * | 10/1999 | Riddle | 348/14.07 |
| 6,038,625 | A | * | 3/2000 | Ogino et al. | 710/104 |
| 6,151,619 | A | * | 11/2000 | Riddle | 709/204 |
| 6,286,054 | B2 | * | 9/2001 | Wang | 719/321 |
| 6,516,356 | B1 | * | 2/2003 | Belknap et al. | 719/328 |
| 6,779,004 | B1 | * | 8/2004 | Zintel | 709/227 |
| 7,167,897 | B2 | * | 1/2007 | Riddle | 709/204 |
| 2001/0016880 | A1 | * | 8/2001 | Cai et al. | 709/321 |
| 2003/0225933 | A1 | * | 12/2003 | Suzuki | 709/321 |

OTHER PUBLICATIONS

Videoconferencing White Paper H.323 Standards, Jan. 1998, pp. 1-21.*

\* cited by examiner

*Primary Examiner*—William Thomson
*Assistant Examiner*—Qing-Yuan Wu
(74) *Attorney, Agent, or Firm*—Oblon, Spivak, McClelland, Maier & Neustadt, P.C.

(57) ABSTRACT

Hot deployable video management modules maintain a video device management platform by integrating independently developed support for new or updated video devices at runtime. A video device module loader builds a management interface for the new or updated video device associated with the management module based on attributes and operations of the video device defined by an XML descriptor and based on access instructions. The management interface is used to create a video device instance in the management platform for each video device under management. The management platform manages a variety of different types of video devices with a video device management module added as a given video device is added to the management platform or an already managed video device is updated.

18 Claims, 4 Drawing Sheets

```
<Device>
    36  <DeviceName>Name</DeviceName>
        <DeviceCategoryType>Endpoint</DeviceCategoryType>
    38  <DeviceDescription>An Endpoint</DeviceDescription>
        <DeviceAccessors>
    40          <DeviceAccessor class="com.forgent.SomeAccessor">
                    <AssessorInitializeParma name ="aParameter">
                </DeviceAccessor>
        </DeviceAccessors>
        <DeviceAttributes>
    42

<Attribute>
                <AttributeName>SomAttribute</AttributeName>
                <AttributeType>java.lang.String</AttributeType>
                <AttributeReadAccessor class="com.forgent.SomeAccessor">
                    <AccessorParam name="key">aParam</AccessorParam>
                </AttributeReadAccessor>
                <AttributeWriteAccessor class="com.forgent.SomeAccessor">
                    <AccessorParam name="key">aParam</AccessorParam>
                </AttributeWriteAccessor>
                <AttributeDescription>Description</AttributeDescription>
            </Attribute>

</DeviceAttributes>
        <DeviceOperations>
    44      <Operation>
                <OperationName>someOperation</OperationName>
                <OperationReturnType>java.lang.String</OperationReturnType>
                <OperationParameters>
                    <Parameter>
                        <ParamName>someParam</ParamName>
                        <ParamType>java.lang.String</ParamType>
                    </Parameter>
                </OperationParameters>
                <OperationAccessor class="com.forgent.SomeAccessor">
                    <AccessorParam name="function">endCall</AccessorParam>
                </OperationAccessor>
                <OperationDescription>End a Call.<OperationDescription>
            </Operation>
        </DeviceOperations>
</Device>
```

*Figure 2*

METHOD AND SYSTEM FOR MANAGING VIDEO DEVICES

RELATED APPLICATIONS

This patent application is related to U.S. patent application Ser. No. 09/919,538 (now U.S. Pat. No. 7,206,808), entitled "System and Method for Managing Video Network Devices" filed on Jul. 31, 2001 by James Joseph Babka and Kurtis L. Seebaldt as inventor, and incorporated herein by reference.

BACKGROUND OF THE INVENTION

1. Field of the Invention

The present invention relates in general to the field of video conferencing, and more particularly to a method and system for managing video devices.

2. Description of the Related Art

Video conferencing devices have improved in both the quality of communication provided between the parties of a video conference and in reduced complexity of video devices to configure and initiate a video call. A number of manufacturers produce many disparate types of video devices that are generally capable of interaction with each other in video conference calls but are typically controlled and managed by a variety of protocols and proprietary management applications. Thus, one type of video endpoint sold by one manufacturer typically interacts in a video call with a different type of video endpoint sold by a different manufacturer in a transparent manner as long as both manufacturers comply with industry standards such as H.320 or H.323. However, the two different types of video endpoints are typically managed with different types of management applications and communication protocols. Further, other video devices, such as gateways, gatekeepers and MCUs, are each typically included in a video network and are also manufactured by a variety of producers with different types of management applications and protocols. If a video network, such as a network owned by a business, includes many different types of devices, then administration of the network can be quite complex and use a number of different types of protocols, applications and interfaces for managing the different types of video devices.

One solution developed by Forgent Corporation for managing disparate video devices is to use a common management platform that provides access to disparate video devices through a common interface. The common management platform interacts with management applications through a uniform or standard protocol and then translates application requests for data or operations into device specific protocols in a manner that makes management of disparate devices transparent to a video network administrator. A difficulty with using a common management platform is that different types of video devices from a variety of manufacturers are frequently introduced to the market. Further, existing video devices are often updated with new features and functions. Thus, keeping a common management platform up to date with support for new and updated video devices is a difficult task both in tracking new releases by a variety of manufacturers and in the incorporation of support for new releases in the common management platform. For instance, updating software on a common management platform may take an extended time to develop, test and deploy. Constantly building new and updated video device support in attempt to keep up with new video devices and changes in existing video devices may leave common management platforms perpetually behind.

SUMMARY OF THE INVENTION

Therefore a need has arisen for a method and system which provides a framework for maintaining a common video device management platform's ability to support new and updated video devices.

A further need exists for a method and system which detects a new or updated video device and automatically updates the common video device management platform to support new or updated video devices.

In accordance with the present invention, a method and system are provided which substantially reduce the disadvantages and problems associated with previous methods and systems for managing disparate types of video devices. A video device management framework updates a video device management platform to provide support for new or updated video devices by deploying a video device management module with information to build a management interface for the management platform to support the new or updated video device.

More specifically, the video device management module is independently developed to define attributes and operation for an associated video device and is hot deployed to integrate with an active video device management platform. For instance, a management module includes an XML descriptor and one or more device specific access modules. The descriptor identifies attributes and operations of the video device and accessors from the device specific access module or other standard access modules that support access to the attributes and operations. The device specific access module includes any custom instructions specific to the device to provide access to attributes or operations of the device. A video device module loader detects the deployment of a management module and parses the XML descriptor to build a management interface for the video device associated with the management module. If a video device of that type is detected as interfaced with the video device management platform, the module loader copies the management interface to a video device instance to support interaction of the video device with video device management platform. Applications, such as management applications that schedule and configure the video device for video calls, interact with the video device through the video device instance of the management platform.

The present invention provides a number of important technical advantages. One example of an important technical advantage is that it provides a framework for maintaining a video device management platform's ability to support new and updated video devices. As a new video device or an update to an existing video device is released, a video device management module is defined for the new device or update. The module provides the information and access instructions for the management platform to build an interface and add a video device instance for the new or updated video device. Thus, a management platform is more easily kept up to date without having to prepare a new release or patch to the management platform by simply adding a management module for each video device that the management platform should support.

Another example of an important technical advantage of the present invention is that it detects a new or updated video device and automatically updates the video device management platform to support new or updated video devices. Video device management modules are hot deployed to an active management platform without shutting down the platform. The video device module loader builds a management interface to support interaction by the management platform with the video device that is associated with the management module and provides the management interface to the platform for insertion into a video device instance. Since the management interface is maintained by the module loader, new or updated video devices detected by the management platform are promptly supported with an appropriate video instance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts one embodiment of an Extensible Mark-up Language schema for a video device management module descriptor;

DETAILED DESCRIPTION

Management of disparate types of video devices through a single platform reduces the complexity of operating a video network by focusing video device management through a common interface. However, the addition of new types of video devices to a video network or the addition of updates to existing types of video devices are difficult to track so that the management platform stays current with the video devices that it manages. In order to aid in keeping a video device management platform current, the present invention provides a management framework that detects added device types or updated device features for existing device types and hot deploys support for the added device or feature without interrupting operations of the management platform. The video device platform management framework accepts added device support for a video device as an independently-developed video device management module and integrates the added support to the management platform at runtime. For each video device added to a management platform, an associated video device management module provides the information needed to build an interface with the video device.

Figure 1:
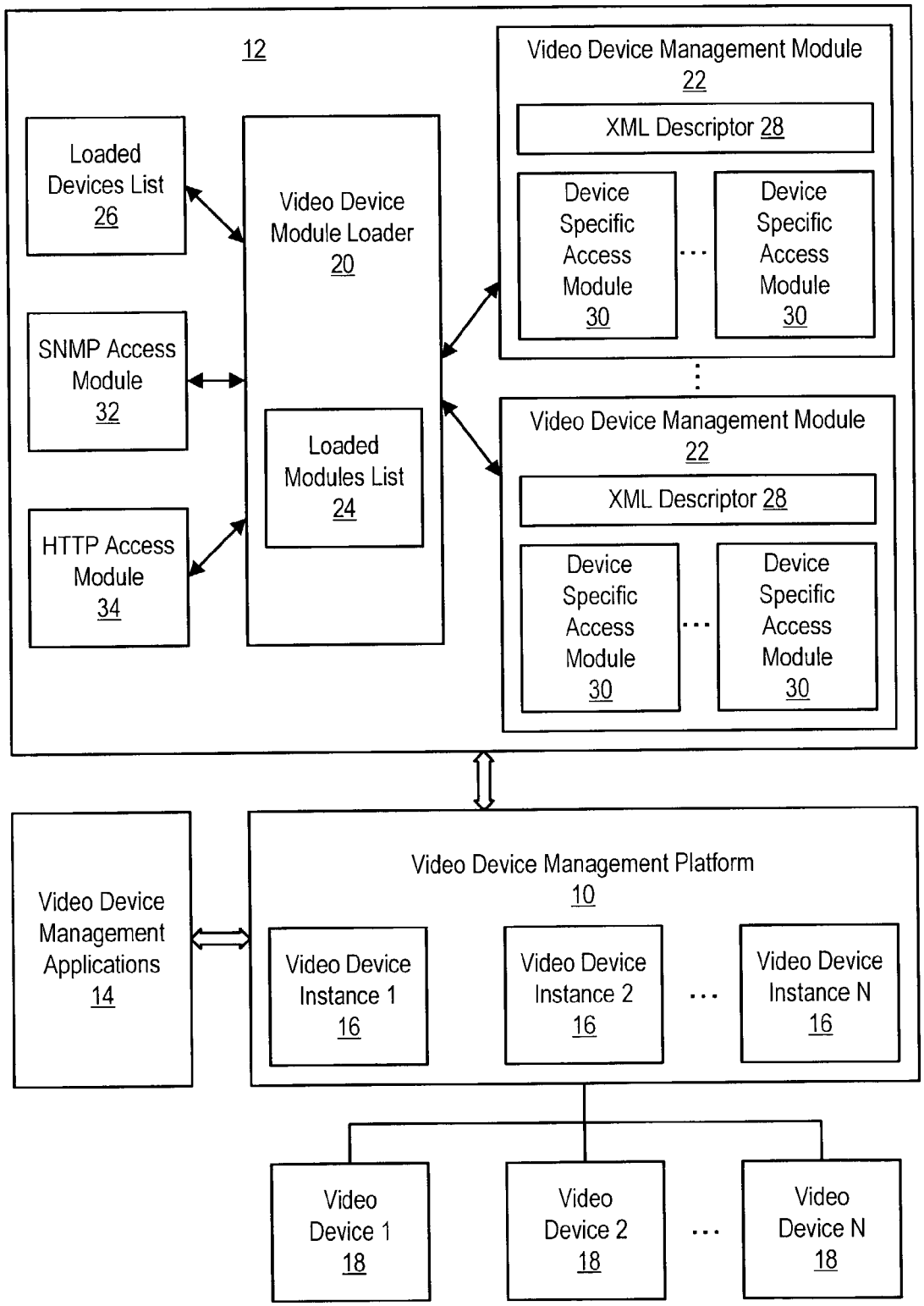
FIG. 1 depicts a block diagram of a video device management framework.

Referring now to FIG. 1, a block diagram depicts a video device management platform 10 interfaced with a video device platform management framework 12. Video device management platform 10 interfaces video device management applications 14 through video device instances 16 to communicate with disparate types of video devices 18. The video devices may be endpoints, gateways, gatekeepers, MCUs or other platforms that support video conferencing and may be manufactured by a variety of different manufacturers with a variety of management interfaces. Video device instances 16 allow video device management applications 14, such as applications for scheduling, configuring and executing a video call, to use a common protocol to communicate with video devices 18 that use disparate types of communication protocols by translating the management application protocol to a device-specific protocol for each type of video device 18. In this manner, video devices 18 from different manufacturers are managed uniformly, even where the video devices 18 communicate with proprietary protocols.

Video device platform management framework 12 interfaces with video device management platform 10 to provide a framework for maintaining video device instances 16 to support added video devices 18 or added features. Video device platform management framework 12 provides runtime updates to video device management platform 10 with video device instances 16 having the added device support, thus reducing the complexity of adding support for added devices and features and avoiding video service shutdowns. A video device module loader 20 monitors video device platform management framework 12 to detect the addition of a video device management module 22. Upon detection of an added video device management module 22, video device module loader 20 uses information provided by video device management module 22 to build a management interface for a video device type associated with the detected video device management module 22 and stores the management interface in a loaded modules list 24. When a new video device 18 of that type is detected as interfaced with video device management platform 10, video device module loader 20 copies the management interface from loaded modules list 24 to create a video device instance 16 for the detected device and adds the device to the loaded devices list 26.

Video device management modules 22 are independently developed modules that interface with video device module loader 20 and provide information for supporting added video devices and features. Video device management modules 22 are written as independent modules for each type of video device so that insertion of a video device management module 22 to the video device platform management framework 12 does not interrupt the operations of video device management platform 10. Video device management module 22 includes information for an identified video device type to interface with video device management platform 10. An XML descriptor 28 describes the interface of the video device type associated with the video device management module, including the attributes available on the video device type and operations available on the video device type. Device specific access modules 30 include custom instructions for the video device type to allow access to attributes or perform operations for video devices of that type.

Video device module loader 20 builds management interfaces for a video device of the type associated with a video device management module by parsing XML descriptor 28 and including instructions for accessing the video device from device specific access modules 30. In addition, video device module loader 20 may incorporate standard device access instructions using standard protocols taken from standard access modules, such as SNMP access module 32 or HTTP access module 34.

FIG. 2 depicts one example of an XML descriptor 28 that defines attributes and operations of a type of video device from which video device module loader 20 builds a management interface. A device name tag 36 identifies the device type with the name of the class of the device. For instance, video endpoints by different manufactures will each have a video device management module 22 to define the attributes and operations of each type of endpoint. A device type category tag 38 identifies the video device in functional categories, such as endpoints, MCUs, gateways and gatekeepers. A device accessors tag 40 lists the accessors from device specific and standard access modules used to access the video device. A device attributes tag 42 identifies the attributes of the video device by name, data type and accessors to read and write to the attribute. A device operations tag 44 identifies the operations supported by the video device by operation name, returned datatype, operation parameters and the accessor used to call the operation.

Video device management modules 22 are added to video device platform management framework 12 as desired to add support to video device management platform 10 for new video devices or for new features for existing video devices. For instance, to define a video device management module 22 with an attribute to report connection status and another attribute to report jitter, the type of interface for each attribute is determined. As an example, connection status may be supported by a standard interface such as SNMP, thus allowing the video device management module to use SNMP access module 32 to define access instructions for the connection status. As a further example, the endpoint may need a custom interface for video jitter so that a device specific access module 30 is written to support reporting of jitter. Thus, attributes for reading and writing jitter are implemented so that the AttributeReadAccessor and the AttributeWriteAccessor each define a method to interface values with the video endpoint based on the values defined by XML descriptor 28.

Figure 3:
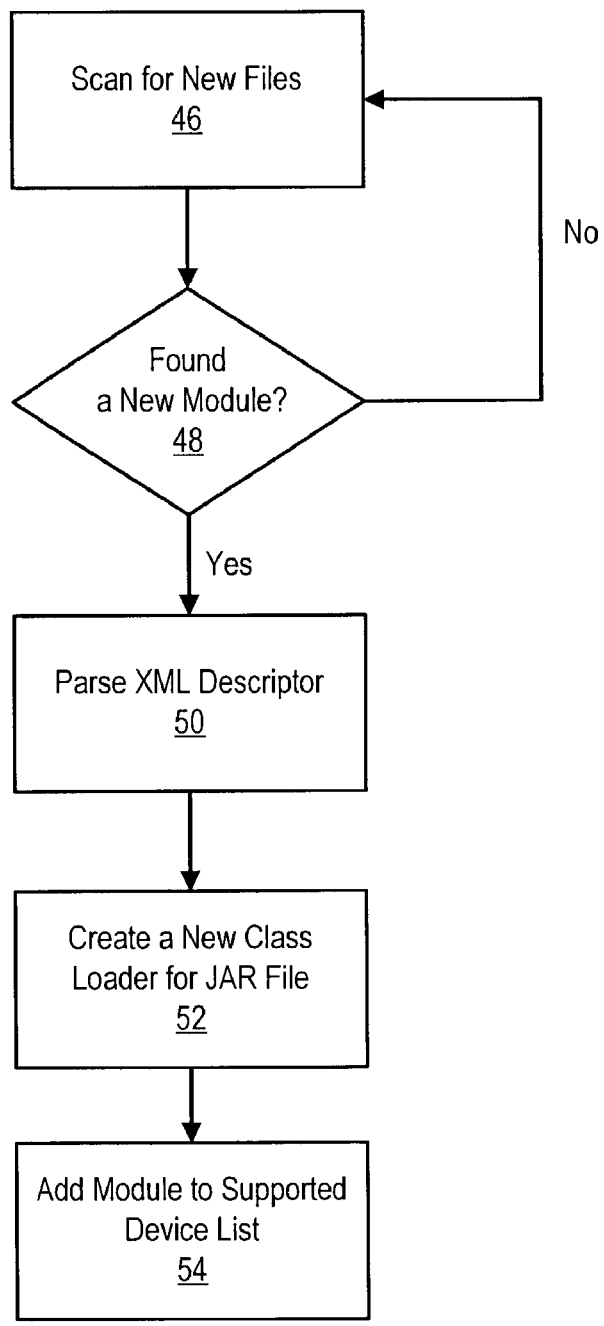
FIG. 3 depicts a flow diagram for adding a video device management module to the management framework.

Referring now to FIG. 3, a flow diagram depicts the process of deploying a video device management module 22 with video device module loader 20 to build a management interface insertable into video device management platform 10 as a video device instance 16. The process begins at step 46 with the video device module loader 20 scanning a deployment directory to detect added video device management modules 22. For instance, newly completed management modules are deployed as compiled JAR files that are dropped into a deployment directory regularly scanned by video device module loader 20. At step 48, if no new modules are found, the process returns to step 46. If a new module is found, the process advances to step 50 to proceed with deployment of the video module. At step 50, XML descriptor 28 is parsed and video device module loader 20 builds a management interface for the video device type associated with the video device management module 22 based on the attributes, operations and accessors defined by XML descriptor 28. At step 52, video device module loader 20 creates a new classloader for pointing to the JAR file so that the accessor can be used and at step 54 the module is added to loaded modules list 24 to indicate that a management interface is available of video devices of the type associated with the added video device module.

Figure 4:
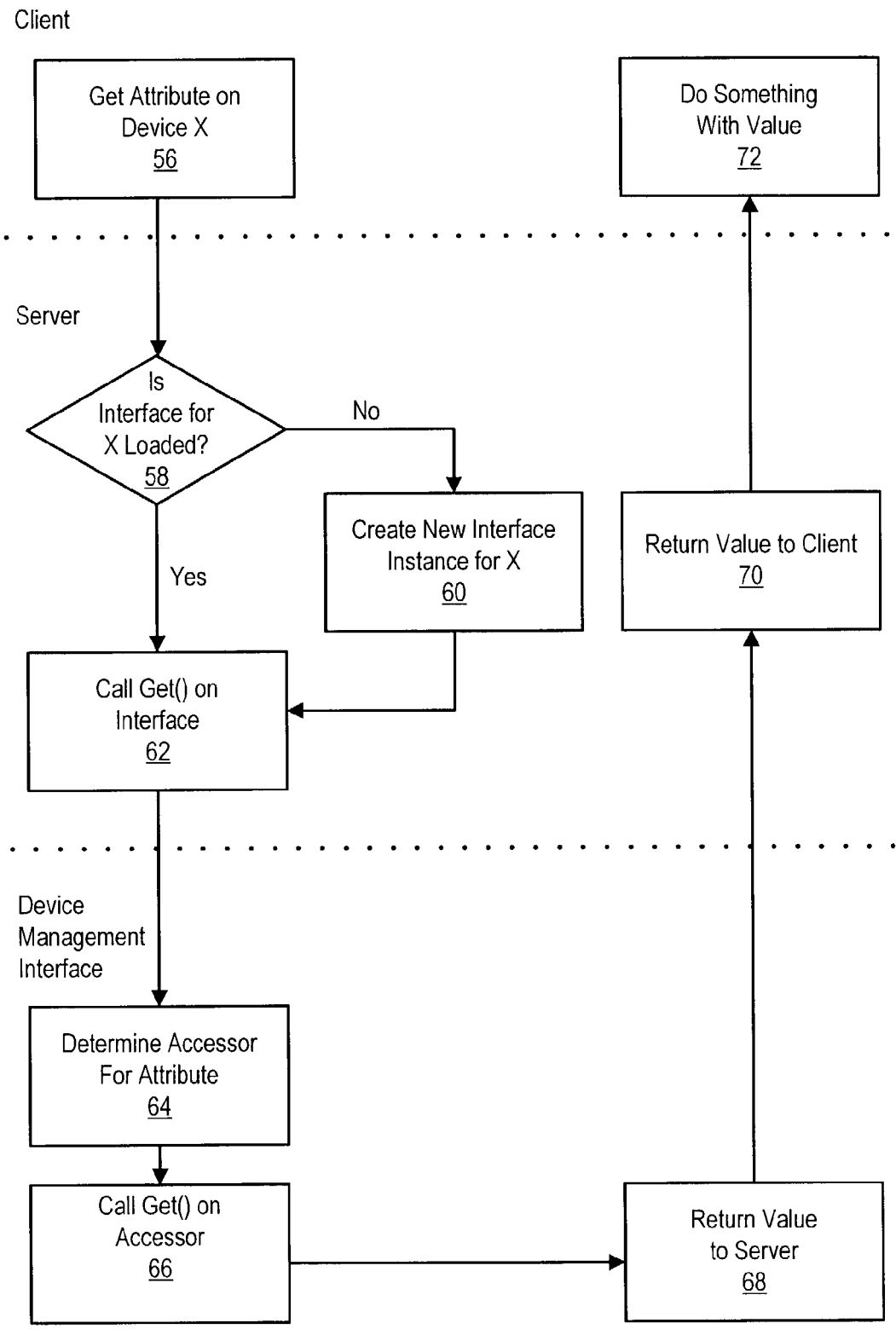
FIG. 4 depicts a flow diagram for management of a video device with an instance generated from a video device management module.

Referring now to FIG. 4, a flow diagram depicts the process for accessing an attribute or operation of a video device 18 though an instance 16 based on a management interface built from a video device management module 22. At step 56, a request is made to the video device from a client, such as a request from a scheduling or configuration application 14 to obtain information regarding the connection status of a video endpoint device X. At step 58, video management platform 10 determines if an interface exists for endpoint device X by scanning for an appropriate video device instance 16. If a video device instance 16 does not exist on video management platform 10, then at step 60 a video device instance 16 is created to support an interface with endpoint X. Video device management platform 10 requests that video device module loader 20 create the instance from a management interface built from a video device management module associated with the device type of the endpoint X.

Once a video device instance 16 exists for endpoint X, the process continues to step 62 at which video device management platform 10 calls a get function to the video device instance for endpoint X to request the connection status attribute. At step 64, the management interface of the video device instance 16 for endpoint X determines the accessor corresponds to the connection status attribute and, at step 66, calls the accessor method to get the connection status. At step 68, the accessor communicates with the device according the protocol of the accessor method and obtains the requested value to return to the server at step 70 and then to the application 14 at step 72 for appropriate action. For instance, in the example described above, the accessor method obtains connection status with SNMP protocol.

Although the present invention has been described in detail, it should be understood that various changes, substitutions and alterations can be made hereto without departing from the spirit and scope of the invention as defined by the appended claims.

What is claimed is:

1. A method for managing plural types of video teleconferencing devices configured to support video teleconferencing through a network, comprising:

defining within a video device management framework a video teleconferencing device management module for a first video teleconferencing device type, the video teleconferencing device management module having a corresponding first video teleconferencing device type description and one or more corresponding first video teleconferencing device type access modules, the first video teleconferencing device type description including a list of first video teleconferencing device type attributes, and each first video teleconferencing device type access module including instructions for managing one or more devices corresponding to the first video teleconferencing device type during at least one of scheduling, configuring and executing a video teleconference;

generating and storing a management interface for the first video teleconferencing device type from the first teleconferencing device type description and the first video teleconferencing device type access instructions;

detecting an addition of a second video teleconferencing device management module to the video device management framework with a video teleconferencing device module loader;

generating and storing a management interface for the second video teleconferencing device type from a corresponding second teleconferencing device type description including a list of second video teleconferencing device type attributes, and from corresponding second video teleconferencing device type access instructions; and at least one of scheduling, configuring and executing a video teleconference between first and second video teleconferencing devices corresponding to at least one of the first and second video teleconferencing device types, wherein said step of at least one of scheduling, configuring and executing a video teleconference includes one of copying a stored management interface from the video device management framework to a video teleconference device management platform interfaced to the first and second video teleconferencing devices to create a corresponding video teleconferencing device instance, and providing a run-time update to a video teleconferencing device instance already stored on the video teleconference device management platform.

2. The method of claim 1, the step of generating a management interface comprising:
incorporating into the management interface device access instructions compliant with a standard protocol.

3. The method of claim 2 wherein the standard protocol comprises SNMP.

4. The method of claim 2 wherein the standard protocol comprises HTTP.

5. The method of claim 1, wherein at least one of the first and second video teleconferencing devices are compliant with one of H.320 and H.323.

6. The method of claim 5, wherein said first video teleconferencing device compliant with one of H.320 and H.323 comprises one of:
a first video teleconferencing endpoint;
a second video teleconferencing endpoint;
a video teleconferencing MCU;
a video teleconferencing gatekeeper; and
a video teleconferencing gateway.

7. The method of claim 5, wherein the first and second video teleconferencing devices comprise:
a first video teleconferencing device made by a first manufacturer; and
a second video teleconferencing device made by a second manufacturer, respectively.

8. The method of claim 6, wherein said second video teleconferencing device compliant with one of H.320 and H.323 comprises another of:
said first video teleconferencing endpoint;
said second video teleconferencing endpoint;
said video teleconferencing MCU;
said video teleconferencing gatekeeper; and
said video teleconferencing gateway.

9. The method of claim 1, further comprising:
scanning a deployment directory within a video device management framework for a new or updated video device management module; and
deploying said new or updated video device management module.

10. A computer program stored in a computer readable storage medium, including instructions configured to cause a computer to implement a method of managing plural types of video teleconferencing devices supporting video teleconferencing through a network, comprising:
defining within a video device management framework a video teleconferencing device management module for a first vide teleconferencing device type, the video teleconferencing device management module having a corresponding first video teleconferencing device type description and one or more corresponding first video teleconferencing device type access modules,
the first video teleconferencing device type description including a list of first video teleconferencing device type attributes, and
each first video teleconferencing device type access module including instructions for managing the first video teleconferencing device type during at least one of scheduling, configuring and executing a video teleconference;
generating and storing a management interface for the first video teleconferencing device type from the first teleconferencing device type description and the first video teleconferencing device type access instructions;

detecting an addition of a second video teleconferencing device management module to the video device management framework with a video teleconferencing device module loader;
generating and storing a management interface for the second video teleconferencing device type from a corresponding second teleconferencing device type description including a list of second video teleconferencing device type attributes, and from corresponding second video teleconferencing device type access instructions; and
at least one of scheduling, configuring and executing a video teleconference between first and second video teleconferencing devices corresponding to at least one of the first and second video teleconferencing device types, wherein
said step of at least one of scheduling, configuring and executing a video teleconference includes one of
copying a stored management interface from the video device management framework to a video teleconference device management platform interfaced to the first and second video teleconferencing devices to create a corresponding video teleconferencing device instance, and
providing a run-time update to a video teleconferencing device instance already stored on the video teleconference device management platform.

11. The method of claim 10, the step of generating a management interface comprising:
incorporating into the management interface device access instructions compliant with a standard protocol.

12. The method of claim 11 wherein the standard protocol comprises SNMP.

13. The method of claim 11 wherein the standard protocol comprises HTTP.

14. The method of claim 10, wherein at least one of the first and second video teleconferencing devices are compliant with one of H.320 and H.323.

15. The method of claim 14, wherein said first video teleconferencing device compliant with one of H.320 and H.323 comprises one of:
a first video teleconferencing endpoint;
a second video teleconferencing endpoint;
a video teleconferencing MCU;
a video teleconferencing gatekeeper; and
a video teleconferencing gateway.

16. The method of claim 14, wherein the first and second video teleconferencing devices comprise:
a first video teleconferencing device made by a first manufacturer; and
a second video teleconferencing device made by a second manufacturer, respectively.

17. The method of claim 15, wherein said second video teleconferencing device compliant with one of H.320 and H.323 comprise another of:
said first video teleconferencing endpoint;
said second video teleconferencing endpoint;
said video teleconferencing MCU;
said video teleconferencing gatekeeper; and
said video teleconferencing gateway.

18. The method of claim 10, further comprising step for:
scanning a deployment directory within the video device management framework for a new or updated video device management module; and
deploying said new or updated video device management module.

* * * * *